United States Patent [19]

Serini et al.

[11] Patent Number: 4,714,746

[45] Date of Patent: Dec. 22, 1987

[54] PROCESS FOR THE PREPARATION OF AROMATIC POLYESTER-CARBONATES HAVING IMPROVED NOTCHED IMPACT STRENGTH, AND POLYESTER-CARBONATES PREPARED THEREBY AND THEIR USE FOR THE PRODUCTION OF MOULDINGS, FILMS AND COATINGS

[75] Inventors: Volker Serini; Dieter Freitag, both of Krefeld; Dietrich Rathmann, Leverkusen, all of Fed. Rep. of Germany

[73] Assignee: Bayer Aktiengesellschaft, Leverkusen-Bayerwerk, Fed. Rep. of Germany

[21] Appl. No.: 918,771

[22] Filed: Oct. 14, 1986

[30] Foreign Application Priority Data

Oct. 23, 1985 [DE] Fed. Rep. of Germany ....... 3537664

[51] Int. Cl.[4] .............................................. C08L 67/02
[52] U.S. Cl. .................................... 525/439; 524/537
[58] Field of Search .......................... 525/439; 528/176

[56] References Cited

U.S. PATENT DOCUMENTS 3,169,121  2/1965  Goldberg ............................. 528/173

Primary Examiner—Patricia A. Short
Attorney, Agent, or Firm—Connolly and Hutz

[57] ABSTRACT

Aromatic polyester-carbonates having greatly differing contents of ester groups possess an improved notched impact strength.

10 Claims, No Drawings

PROCESS FOR THE PREPARATION OF AROMATIC POLYESTER-CARBONATES HAVING IMPROVED NOTCHED IMPACT STRENGTH, AND POLYESTER-CARBONATES PREPARED THEREBY AND THEIR USE FOR THE PRODUCTION OF MOULDINGS, FILMS AND COATINGS

The invention relates to mixtures of aromatic polyester-carbonates which can be processed by thermoplastic means and have an improved notched impact strength, the polyester-carbonates having differing contents of ester groups, to a process for the preparation of these mixtures and to the use of these mixtures for the production of mouldings, films and coatings.

Aromatic polyester-carbonates combine in themselves the good melt flow of aromatic polycarbonates and the high dimensional stability under heat of fully aromatic polyesters. They are therefore attracting increasing interest amongst processors of thermoplastic resins.

It has now been found, surprisingly, that aromatic polyester-carbonates having an improved notched impact strength are obtained if polyester-carbonates having greatly differing contents of ester groups are mixed with one another.

The invention relates to a process for the preparation of aromatic polyester-carbonates based on diphenols, aromatic dicarboxylic acids, carbonic acid derivatives, if appropriate chain terminators and, if appropriate, branching agents, characterized in that I. 10 to 90, preferably 25 to 75 and especially 40 to 60, % by weight, relative to the sum of I +II, of a polyester-carbonate having an ester group content, relative to the sum of the ester and carbonate groups of the polyester-carbonate I, of 5 to 35, preferably 10 to 30 and especially 20 to 30, mol %, and II. 90 to 10, preferably 75 to 25 and especially 60 to 40, % by weight, relative to the sum of I +II, of a polyester-carbonate having an ester group content, relative to the sum of the ester and carbonate groups of the polyester-carbonate II, of 60 to 95, preferably 60 to 85, and especially 70 to 80, mol %, are homogenized in the melt.

In the process according to the invention conditions which promote transesterification of the components I and II to form a polyester-carbonate will be avoided, that is to say in the case of an extrusion, for example, the lowest possible temperatures and the shortest possible dwell times will be chosen. It is preferable for transesterification catalysts to be absent. If transesterification catalysts are present (for example in products which have been prepared by melt transesterification), it will be sensible to deactivate catalysts. Transesterification can then be largely avoided. Under favourable conditions transesterification takes place to the extent of not more than 50, preferably not more than 30 and especially not more than 10, % by weight; in other words: at least 50, preferably at least 70 and especially at least 90, % by weight of unchanged starting material are present, relative to the sum of I +II.

The invention also relates to mixtures prepared by the process described above.

Diphenols which are preferred for the preparation of the polyester-carbonates I and II are compounds of the formula

HO—Z—OH (III)

wherein Z denotes a divalent, mononuclear or polynuclear aromatic radical having in each case 6–30 C atoms, the structure of Z being such that the two OH groups are each directly attached to a C atom of an aromatic system.

Diphenols which are particularly preferred are compounds of the formula

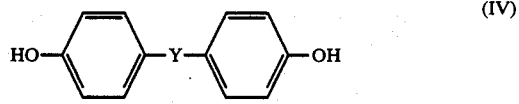
(IV)

in which Y denotes a single bond, an alkylene or alkylidene radical having in each case 1–7 C atoms, a cycloalkylene or cycloalkylidene radical having in each case 5–12 C atoms, —O—, —S—,

—SO₂— or

and also derivatives thereof which are alkylated and/or halogenated in the nucleus, for example: hydroquinone, resorcinol, dihydroxybiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones, α,α′-bis-(hydroxyphenyl)-diisopropylbenzenes and phthaleins, and also compounds thereof which are alkylated and/or halogenated in the nucleus. These and other suitable diphenols are described, for example, in U.S. Pat. Specifications Nos. 3,028,365, 3,275,601, 3,148,172, 3,062,781, 2,991,273, 3,271,367, 2,999,835, 2,970,131, 1,570,704, 2,064,050, 2,063,052, 2,211,956 and 2,211,957, in French Patent Specification 1,561,518 and in the Monograph "H. Schnell, Chemistry and Physics of Polycarbonates, Interscience Publishers, New York, 1964".

The most important diphenols may be listed individually, as follows: bisphenol A, bis-(4-hydroxyphenyl)-methane, bis-(4-hydroxyphenyl)-2-butane, bis-(4-hydroxyphenyl), 1,1-bis-(4-hydroxyphenyl)-cyclohexane, 2,2-bis-(3-methyl-4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxy-phenyl)-propane, bis-(4-hydroxyphenyl) sulphide, bis-(4-hydroxyphenyl) sulphone, α,α′-bis-4-hydroxyphenyl)-p-diisopropylbenzene and phenolphthalein.

In accordance with a preferred embodiment, the polyester-carbonates I and II independently of one another contain at least 90, in particular 100, mol % of bisphenol A radicals, relative to incorporated diphenol units.

In accordance with a preferred embodiment, the polyester-carbonates I and II independently of one another contain at least 70, preferably at least 90 and especially 100, mol % of isophthalic and/or terephthalic acid radicals, relative to incorporated dicarboxylic acid units. In addition to isophthalic and/or terephthalic acid radicals, the preferred polyester-carbonates I and II can contain up to 30, preferably up to 10, mol % of co-condensed radicals of other aromatic dicarboxylic acids having 8 to 18 C atoms, such as, for example, radicals of: o-phthalic acid, 5-tert.-butylisophthalic acid, monochloroterephthalic acid, 2,5-dichloroterephthalic acid, diphenyl-ether-4,4'-dicarboxylic acid, 1,2-diphenoxyethane-4,4'-dicarboxylic acid, diphenylmethane-4,4'-dicarboxylic acid, biphenyl-4,4'-dicarboxylic acid, naphthalene-1,4-dicarboxylic acid, naphthalene-1,8-dicarboxylic acid or mixtures thereof.

The proportion of terephthalic acid radicals in the isophthalic and terephthalic acid radicals of the preferred polyester-carbonates I and II is 0 to 100, preferably 2 to 15, 30 to 70 and 80 to 97 and especially 5 to 10, 40 to 60 and 85 to 94%.

The polyester-carbonates I and II of the preferred mixtures according to the invention contain 0.5 to 20, preferably 1.0 to 15, and especially 2 to 10, mol % of end groups, relative to the sum of the diphenol radicals which are co-condensed in the polyester-carbonates I and II.

The compounds which are suitable for use as chain terminators, and hence suitable for regulating the molecular weight, are known and are described, for example, in EP-A 8,492 and U.S. Pat. Specifications Nos. 4,438,255 and 4,330,663. Preferred chain terminators are monofunctional aromatic hydroxy compounds, such as 4-hydroxybiphenyl, p-nonylphenol, 4-(1,1,3,3-tetramethyleneethyl)-phenol, chloroformic acid esters, such as ethyl and phenyl chloroformates, and aliphatic and aromatic carboxylic acid chlorides, such as stearyl chloride and naphthalenecarboxylic acid chlorides. Particularly preferred end groups are those described in EP-A 36,080, which correspond to the formula

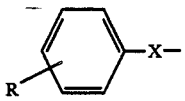

(V)

wherein —X— represents —O— or —CO— and R represents a branched alkyl radical having 8 to 9 C atoms, subject to the proviso that the proportion of methyl hydrogen atoms in the alkyl radical R is 47 to 89%, relative to the sum of the hydrogen atoms in the alkyl radical, and that R is in the o-position and/or p-position.

End groups which are particularly preferred are

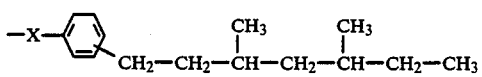

and

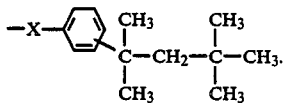

Preferred end groups V are those in which at least 80%, especialy 100%, of the substituent R are in the p-position.

Examples of preferred branching agents are trifunctional or polyfunctional carboxylic acid chlorides, such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride, in amounts of 0.01 to 1.0 mol % (relative to dicarboxylic acid radicals) or trifunctional or polyfunctional phenols, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenylethane, tri-(4-hydroxyphenyl)-phenylmethane, 2,2-bis[4,4-bis-(4-hydroxyphenyl)-cyclohexyl]-propane, 2,4-bis-(4-hydroxyphenylisopropyl)-phenol, tetra(4-hydroxyphenyl)methane, 2,6-bis-(2-hydroxy-5-methylbenzyl)-4-methylphenyl, 2-(4-hydroxyphenyl)-2-(2,4-dihydroxyphenyl)-propane, tetra-(4-[4-hydroxyphenylisopropyl]-phenoxy)-methane and 1,4-bis-[(4,4''-dihydroxytriphenyl)methyl]-benzene, in amounts of 0.01 to 1.0 mol % (relative to diphenol radicals employed).

As a rule, the polyester-carbonates I and II have relative viscosities of 1.15 to 2.0, preferably 1.2 to 1.5 (measured in a 0.5% strength by weight solution in methylene dichloride at 25° C.).

Polyester-carbonates with and without end groups V are known (DE-OS (German Published Specification) No. 3,007,934). They can be prepared by various known processes, for example by melt esterification, by the so-called pyridine process in a homogeneous solution and by the two-phase boundary process.

The polyester-carbonates I and II can contain the ester groups in the form of blocks or randomly distributed, depending on the process of preparation.

It is possible to add to the mixtures according to the invention fillers and reinforcing materials, such as, for example, minerals, carbon black, glass fibres, carbon fibres, metal fibres, dyestuffs, pigments, heat stabilizers, oxidation stabilizers, UV stabilizers, plasticizers, lubricants, mould release agents and additives imparting flame resistance, such as, for example, halogenated organic compounds, metal oxides, metal salts and other additives.

The mixtures according to the invention can be used, for example, for the production of lenses, lamp reflectors, automobile headlamp reflectors, lamp masks, lamp caps, lamp canopies, high-voltage switchgear, multi-point connectors, meter cases, microwave tableware, films and coatings.

The invention also relates, therefore, to the use of the polyester-carbonates prepared in accordance with the invention for the production of mouldings, films and coatings.

EXAMPLES

Starting components:

A. Bisphenol A polycarbonate containing phenyl end groups, $\eta_{rel}=1.277$ (PC-P);

B. Polyester based on bisphenol A and isophthalic and terephthalic acid (1:1) containing phenyl end groups, $\eta_{rel}=1.285$ (APE-P);

C. Polyester-carbonate based on bisphenol A and isophthalic and terephthalic acid (100:20.8:20.8 mol) containing 4.5 mol % of phenyl end groups, corresponding to an ester group content of 42 mol %, $\eta_{rel}=1.276$ (V-PEC-P 50);

D. Polyester-carbonate based on bisphenol A and isophthalic and terephthalic acid (100:37:37 mol) containing 4 mol % of phenyl end groups, corresponding to an ester group content of 74 mol %, $\eta_{rel}=1.283$ (PEC-P 80);

E. Polyester-carbonate based on bisphenol A and isophthalic and terephthalic acid (100:11.7:11.7 mol) containing 4 mol % of phenyl end groups, corresponding to an ester group content of 23 mol %, $\eta_{rel}=1.279$ (PEC-P 30);

F. Polyester-carbonate based on bisphenol A and isophthalic and terephthalic acid (100:37:37 mol) containing 4.0% of isooctylphenyl end groups, corresponding to an ester group content of 74 mol %, $\eta_{rel}=1.286$ (PEC-I 80); and G. Polyester-carbonate based on bisphenol A and isophthalic and terephthalic acid (100:11.7:11.7 mol) containing 4.0% of isooctylphenyl end groups, corresponding to an ester group content of 23 mol %, $\eta_{rel}=1.283$.

The components A and B, C, D and E and also F and G were each extruded via a twin-screw extruder in such proportions that mixtures having a total ester group content of 42 mol % were formed.

Test specimens on which the Izod notched impact strength was determined at various temperatures were prepared from the resulting products. The results are shown in the following table.

| Temperature of measurement [°C.] | Izod notched impact strength (ASTM D 256) [J/m] | | | |
|---|---|---|---|---|
| | APE/ PC | V-PEC-P 50 | PEC-P80/ PEC-P 30 | PEC-I 80/ PEC-I 30 |
| 23 | 470* | 510* | 610* | 650* |
| 10 | 450 | 480 | 570* | 600* |
| 0 | 450 | 460 | 550* | 580* |
| −10 | 410 | 450 | 550 | 590* |
| −20 | 410 | 460 | 540 | 580* |

*denotes ductile fracture

We claim:

1. Process for the preparation of aromatic polyester-carbonates based on diphenols, aromatic dicarboxylic acids, carbonic acid derivatives, characterized in that I. 10 to 90% by weight, relative to the sum of I +II, of a polyester-carbonate having an ester group content of 5 to 35 mol %, relative to the sum of the ester and carbonate groups of the polyester-carbonate I, and II. 90 to 10% by weight, relative to the sum of I +II, of a polyester-carbonate having an ester group content of 60 to 95 mol %, relative to the sum of ester and carbonate groups of the polyester-carbonate II, are homogenized in the melt.

2. Process according to claim 1, characterized in that 25 to 75% by weight of I and 75 to 25% by weight of II are homogenized in the melt.

3. Process according to claim 1, characterized in that 40 to 60% by weight of I and 60 to 40% by weight of II are homogenized in the melt.

4. Process according to claim 1, characterized in that the ester group content of the polyester-carbonate I is 10 to 30 mol % and that of the polyester-carbonate II is 60 tO 85 mol %.

5. Process according to claim 1, characterized in that the ester group content of the polyester-carbonate I is 20 to 30 mol % and that of the polyester-carbonate II is 70 to 80 mol %.

6. Process according to claim 1, characterized in that at least one of the polyester-carbonate I and the polyestercarbonate II contain at least 70 mol %, relative to incorporated diphenol units, of bisphenol A radicals.

7. Process according to claim 6, characterized in that the content of bisphenol A radicals is at least 90 mol %.

8. Process according to claim 6, characterized in that the content of bisphenol A radicals is 100 mol %.

9. Polyester-carbonates produced by the process according to claim 1 wherein after mixing in the melt, at least 50% by weight of component I has an ester group content of 5 to 35 mol-% and at least 50% by weight of component II has an ester group content of 60 to 95 mol-%.

10. Moulded articles, films and coatings comprising polyester-carbonates as claimed in claim 9.

* * * * *